UNITED STATES PATENT OFFICE.

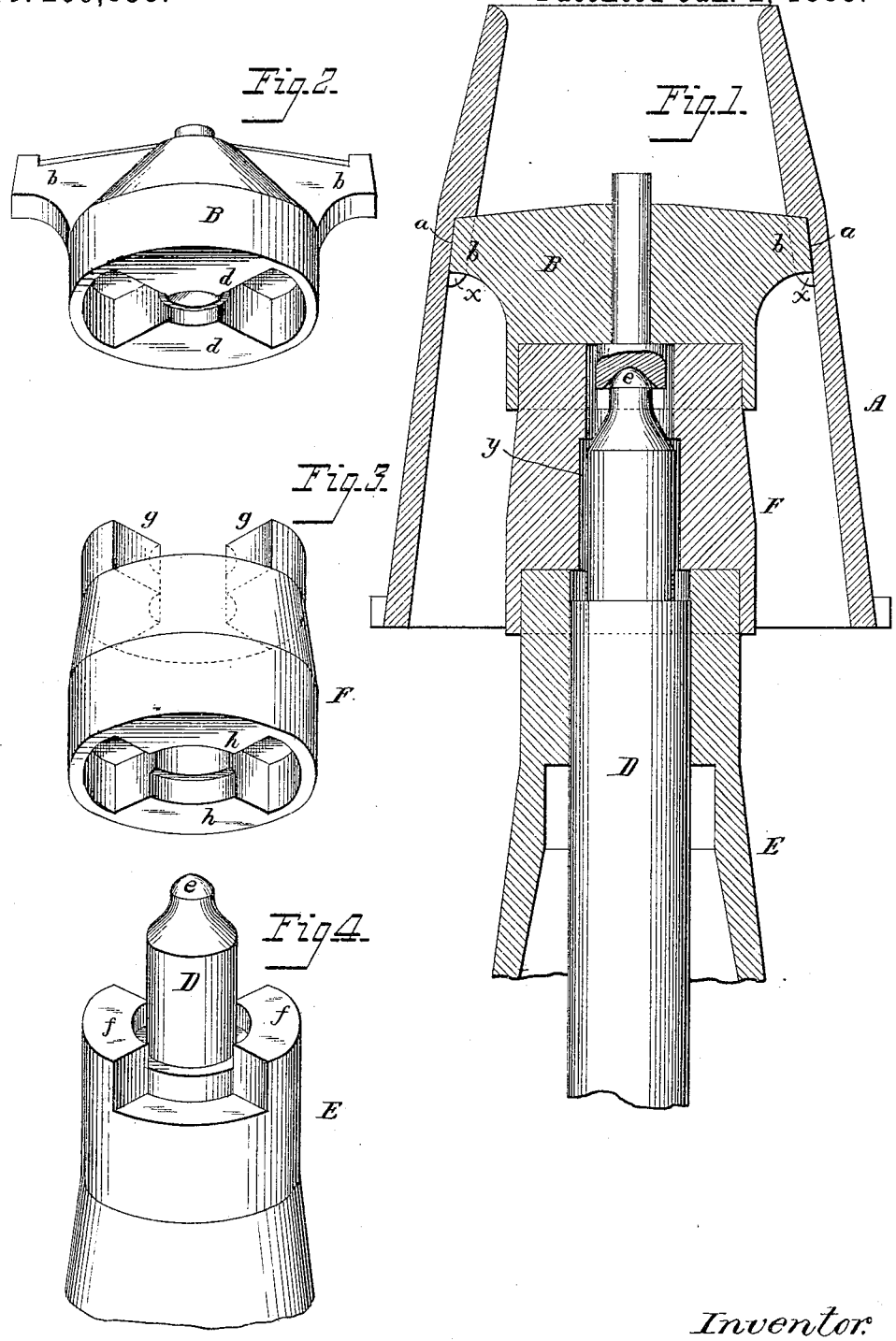

HENRY HEARD, OF GREENSBOROUGH, GEORGIA.

MILLSTONE-DRIVER.

SPECIFICATION forming part of Letters Patent No. 269,853, dated January 2, 1883.

Application filed June 6, 1882. (No model.)

*To all whom it may concern:*

Be it known that I, HENRY HEARD, a citizen of the United States, and a resident of Greensborough, Greene county, Georgia, have invented certain Improvements in Millstone-Drivers, of which the following is a specification.

My invention is a driving-connection for grinding-mills and other machinery, constructed as fully described hereinafter, so as to avoid straining of the drive-shaft or spindle and avoid undue friction and wear.

In the drawings, Figure 1 is a sectional elevation, showing part of a millstone-spindle and the improved driving-connection between it and the stone. Fig. 2 is a perspective view of the driven or balance piece; Fig. 3, a perspective view of the sleeve-connection between the driven piece and the driver on the spindle. Fig. 4 is a view of the spindle and clutch-piece.

The spindle D terminates in a point, e, having its bearing in the cup-shaped socket or cock-pit of a driven cross-piece, B, adapted for attaching to the machine or part to be driven. As shown, the cross-piece is adapted to a hollow metallic sleeve, A, constructed to fit the eye of the upper millstone. At the inside of this sleeve nearest the upper end are two opposite sockets, x x, with inclined faces a a, and adapted to receive the ends of arms b b of the cross-piece B, which is recessed at the under side, and provided with segmental clutch-lugs d d within said recess.

To the shaft or spindle D is secured movably a clutch-sleeve, E, having at the upper end segmental clutch-lugs f, or the latter may be formed on the shaft. Between the sleeve E and the cross-piece B intervenes a hollow connecting-piece or cylinder, F, its recess y being of such diameter that the cylinder can play laterally without striking the spindle or shaft; and at the upper end of the cylinder are segmental clutch-lugs g, and at the bottom segmental clutch-lugs h, arranged as shown— that is, so that the lugs g will be above the spaces between the lugs h.

The inclined ends of the arms b are brought firmly into contact with the inclined faces a of the sockets x by the weight of the stone or other part to be driven, so that the connection of the cross-piece and sleeve A is practically as secure as if the two were cast together; but the making of the same in separate pieces allows for easier and more accurate shaping of the balance-piece and facilitates greatly the casting of the sleeve, thus reducing cost of manufacture.

The stone, machine, or shaft receives its rotation from the spindle or shaft through the medium of the cylinder or piece F, connecting the sleeve E and cross-piece B, the lugs f and h interlocking and turning the cylinder F, and the lugs g and d interlocking and turning the cross-piece and the machine or shaft to which it is connected.

By arranging the lugs g h as shown they may be fitted so as to completely fill the recesses between the lugs d d and f f, preventing all rattling or moving of the contact-faces to and from each other, but permitting said faces to slide on each other, thus allowing the cylinder to rock upon the spindle or shaft, adjusting itself to accommodate various movements and insuring a steady uniform motion without any straining of any of the parts and without jars or noisy vibrations.

I claim as my invention—

The combination of the spindle D, cross-piece B, having segmental lugs d d and a bearing for the end of the spindle, segmental lugs f f on the spindle, and the intermediate cylinder, F, having a recess, y, and at the ends segmental clutch-pieces, arranged alternately and fitting nicely between the lugs d d f f, substantially as set forth.

In testimony whereof I have signed my name to this specification in the presence of two subscribing witnesses.

HENRY HEARD.

Witnesses:
W. B. JACKSON,
L. SCHEVENELL.